(12) United States Patent
Pardo et al.

(10) Patent No.: US 12,032,963 B2
(45) Date of Patent: Jul. 9, 2024

(54) PROCESSOR WITH INSTRUCTIONS FOR RESETTING MULTIPLE REGISTERS

(71) Applicant: MELLANOX TECHNOLOGIES, LTD., Yokneam (IL)

(72) Inventors: Ilan Pardo, Ramat-Hasharon (IL); Evgeny Pimenov, Pardes Hanna Karkur (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 121 days.

(21) Appl. No.: 17/709,464

(22) Filed: Mar. 31, 2022

(65) Prior Publication Data

US 2023/0315457 A1 Oct. 5, 2023

(51) Int. Cl.
*G06F 9/30* (2018.01)
*G06F 1/08* (2006.01)

(52) U.S. Cl.
CPC ............ *G06F 9/30145* (2013.01); *G06F 1/08* (2013.01); *G06F 9/30105* (2013.01)

(58) Field of Classification Search
CPC .................. G06F 9/30105; G06F 9/30145
See application file for complete search history.

(56) References Cited

U.S. PATENT DOCUMENTS

| | | | |
|---|---|---|---|
| 2010/0014784 A1* | 1/2010 | Silverbrook | G06V 30/142 |
| | | | 382/313 |
| 2018/0300159 A1* | 10/2018 | Gschwind | G06F 9/30058 |
| 2021/0224380 A1* | 7/2021 | Grocutt | G06F 9/30076 |

OTHER PUBLICATIONS

Waterman et al., "The RISC-V Instruction Set Manual, vol. I: User Level ISA, Version 2.1," Technical Report No. UCB/EECS-2016-118, Electrical Engineering and Computer Sciences, University of California at Berkeley, pp. 1-133, May 31, 2016.

* cited by examiner

*Primary Examiner* — Zachary K Huson
(74) *Attorney, Agent, or Firm* — KLIGLER & ASSOCIATES PATENT ATTORNEYS LTD.

(57) ABSTRACT

A processor includes a set of registers and a processing core. The processing core is configured to execute instructions, including an instruction that causes the core to reset a plurality of the registers in the set.

24 Claims, 1 Drawing Sheet

PROCESSOR WITH INSTRUCTIONS FOR RESETTING MULTIPLE REGISTERS

FIELD OF THE INVENTION

The present invention relates generally to microprocessor design, and particularly to processors having instructions for resetting multiple registers.

BACKGROUND OF THE INVENTION

Various types of processors, having various Instruction Set Architectures (ISAs), are known in the art. Some processors use Reduced Instruction Set Computer (RISC) architectures. The ISA of RISC-V processors, for example, is described in "The RISC-V Instruction Set Manual, Volume I: User Level ISA, Version 2.1," May 31, 2016.

SUMMARY OF THE INVENTION

An embodiment of the present invention that is described herein provides a processor including a set of registers and a processing core. The processing core is configured to execute instructions, including an instruction that causes the core to reset a plurality of the registers in the set.

In some embodiments, the instruction causes the processing core to reset all the registers except for a specified register. In an example embodiment the specified register is a stack pointer. In another embodiment, the set of registers includes caller-saved registers and callee-saved registers, and the instruction causes the processing core to reset the caller-saved registers. In yet another embodiment, the set of registers includes caller-saved registers and callee-saved registers, and the instruction causes the processing core to reset the callee-saved registers.

In a disclosed embodiment, the instruction causes the processing core to reset the plurality of the registers in a single clock cycle. In some embodiments, the processing core is a Reduced Instruction Set Computer (RISC) core.

There is additionally provided, in accordance with an embodiment of the present invention, a network device including a network interface for communicating packets with a network, and a packet processor including a set of registers and a processing core. The processing core is configured to execute instructions, including an instruction that causes the core to reset a plurality of the registers in the set.

There is additionally provided, in accordance with an embodiment of the present invention, a method including, in a processor, executing instructions that access a set of registers. As part of executing the instructions, an instruction that causes the processor to reset a plurality of the registers in the set is executed.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved processors whose instruction Set Architectures (ISA) support instructions for resetting (e.g., zeroing) multiple registers. The embodiments described herein are described in the context of a Reduced Instruction Set Computer (RISC) processor deployed in a network device, by way of example. The disclosed techniques are applicable, however, in various other types of processors, systems and use-cases.

One example instruction causes the processor to reset all registers except one, for example the stack pointer. Such an instruction is useful, for example, for preventing information leakage upon task switching.

Another example instruction causes the processor to reset all caller-saved registers. This sort of instruction is useful, for example, for preventing information leakage upon returning from a system all.

Yet another example instruction causes the processor to reset all callee-saved registers. This instruction is useful, for example, for preventing information leakage to the operating system. (OS), e.g., in confidential computing applications.

In some embodiments, in executing the disclosed instructions, the processor resets the plurality of registers in a single clock cycle. As such, the techniques described herein reduce the latency incurred by task switching and system calls. The disclosed techniques are thus highly beneficial in multitasking and/or event-driven applications, one typical use-case being a packet processor in a network device.

System Description

Figure 1:
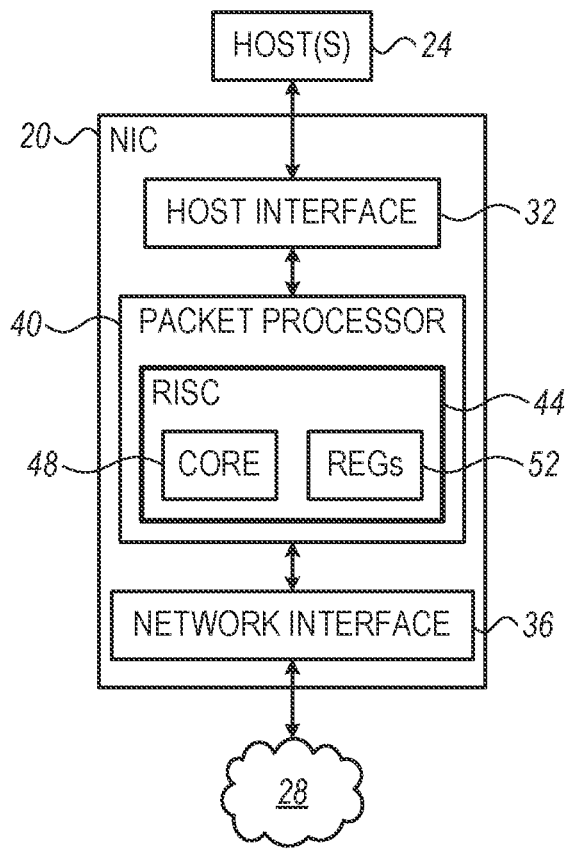
FIG. 1 is a block diagram that schematically illustrates a network device, in accordance with an embodiment of the present invention.

FIG. 1 is a block diagram that schematically illustrates a network device, in the present example a Network Interface Controller (NIC) 20, in accordance with an embodiment of the present invention. NIC 20 connects one or more hosts 24 to a packet network 28. NIC 20 comprises a host interface 32 for communicating with hosts 24, a network interface 36 for communicating with network 28, and a packet processor 40 for performing the various processing tasks of the NIC. Network 28 and NIC 20 may operate in accordance with any suitable network protocol, such as Ethernet of InfiniBand (IB).

In the example of FIG. 1, packet processor 40 comprises, among other components, a RISC 44 that runs suitable software. The description that follows refers to RISC, and in particular RISC-V, by way of example. Generally, RISC 44 is regarded as an example of a processor, and the disclosed techniques can be used with any other suitable processor type.

RISC 44 comprises a processing core 48 (also referred to simply as "core" for brevity) and a set or registers 52. Core 48 executes instructions in accordance with the RISC's applicable Instruction Set Architecture (ISA). In the present example the ISA is the RISC-V ISA, cited above.

The configuration of NIC 20 depicted in FIG. 1 is an example configuration that is chosen purely for the sake of conceptual clarity. Any other suitable configuration can be used in alternative embodiments. In various embodiments, NIC 20 may be implemented using suitable software, using suitable hardware such as one or more Application-Specific Integrated Circuits (ASIC) or Field-Programmable Gate Arrays (FPGA), or using a combination of hardware and software.

Some elements of NIC 20, e.g., RISC 44, may be implemented using one more general-purpose processors, which are programmed in software to carry out the techniques described herein. The software may be downloaded to the processors in electronic form, over a network, for example, or it may, alternatively or additionally, be provided and/or stored on non-transitory tangible media, such as magnetic, optical, or electronic memory.

Small-Latency System Calls and Task Switching Using Instructions for Resetting Multiple Registers In practical scenarios, the operation of RISC 44 in NIC 20 is predominantly multi-tasking, event-driven operation. On reception, for example, arrival of a packet from network 28 typically causes an event, e.g., an interrupt, which triggers RISC 44 to process the packet. Transmission of a packet to the network is also typically triggered by a similar mechanism. When processing multiple packet flows, possibly associated with multiple hosts, RISC 44 has to perform large numbers of system calls and task-switching operations per second. In such an environment, any latency overhead incurred by system calls and task-switching operations has a major impact on the performance of NIC 20.

In some embodiments of the present invention, the ISA of core 48 comprises one or more instructions that reset a plurality of registers 52. Each such instruction causes core 48 to reset multiple registers in a single instruction, and in some embodiments in a single clock cycle. Resetting of multiple registers is an operation that is commonly required in processing task-switching and system calls. As such, performing this operation in a single instruction, e.g., in a single clock cycle, reduces the task-switching and system call latency.

In the context of the present disclosure and in the claims, the term "resetting a register" means any operation that sets a register to a value that is not indicative of the value of the register prior to the operation. The embodiments described herein refer mainly to resetting registers by setting the register values to zero (also referred to as "zeroing" or "nulling"). Alternatively, any other suitable form of resetting can be used. For example, different registers may be reset to the same values or to different values. As another example, when resetting a given bit, it may be possible to reset only a subset of the bits of the register. Any other suitable way of resetting can be used, provided that the register value after resetting is not indicative of the register value prior to resetting.

In some embodiments, one or more or the disclosed instructions are specified as custom extensions to the RISC-V ISA, as follows:

format, rs1 (specified in bits 19:15 of the instruction) denotes the register whose value is to remain unchanged. All other registers are to be reset. One example usage of this command is resetting all registers except for the stack pointer (in which case bits 19:15 of the instruction are set to 0x2, i.e., "00010").

Such an instruction is useful, for example, when switching between tasks whose information should be isolated from one another, e.g., tasks that are associated with different hosts 24. Alternatively, the ZALLBUTONE instruction may also be used for avoiding information leakage upon privilege changes.

Resetting of Caller-Saved Registers

The ZCALLER instruction causes core 48 to reset all caller-saved registers. The term "caller-saved registers" means registers that should be saved by an entity upon calling a function. In RISC-V, for example, caller-saved registers are specified in Chapter 20 ("Calling Convention") of the RISC-V Instruction Set Manual, cited above.

In an example use-case, the operating system (OS) of RISC 44 resets the caller-saved registers before returning from a system call. Such resetting is important, for example, for preventing information leakage from the system's kernel space to the user space. Preventing kernel-space to user-space leakage is important, for example, when system calls can be made by various hosts 24.

Figure 2:
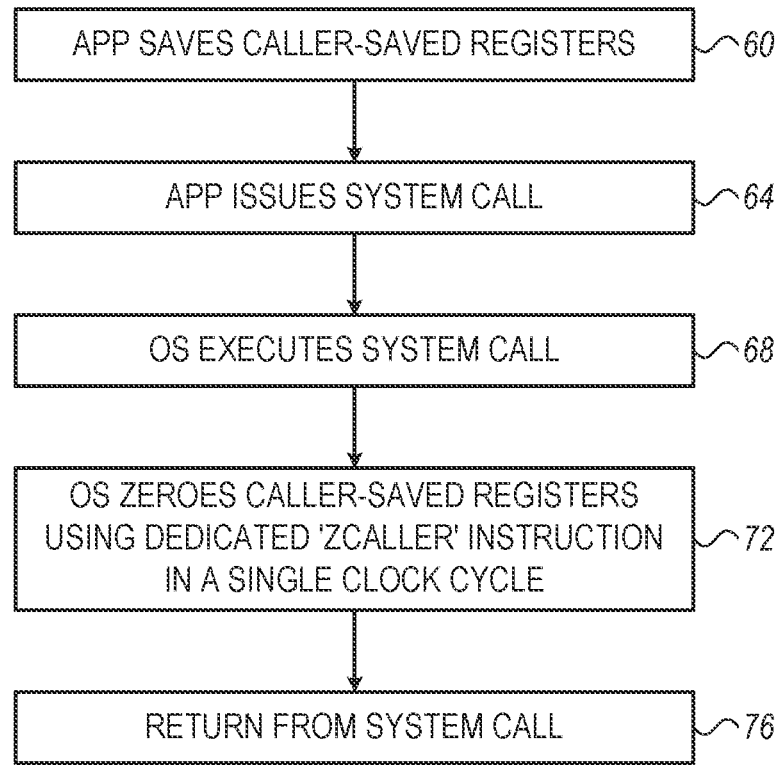
FIG. 2 is a flow chart that schematically illustrates a method for performing a system call, including resetting of caller-saved registers, in accordance with an embodiment of the present invention.

FIG. 2 is a flow chart that schematically illustrates a method for performing a system call, including resetting of caller-saved registers, in accordance with an embodiment of the present invention. The method begins when an application ("app") running on a host 24 intends to issue a system call to the operating system of core 48. The method begins with the app saving the caller-saved registers, at a saving stage 60. The app then issues the system call, at a calling stage 64. The OS of core 48 executes the system call, at an execution stage 68.

Before returning from the system call, the OS resets (in the present example zeroes) the caller-saved registers using the ZCALLER instructions, at a resetting stage 72. The resetting operation ensures that the contents of the caller-saved registers (which may have been used by the system call) will not be accessible to other apps or hosts. An underlying assumption is that the OS will reset the callee-saved registers without a need for an explicit instruction, since this is the expected calling convention. The OS then returns from the system call, at a returning stage 76.

Resetting of Callee-Saved Registers

The ZCALLEE instruction causes core 48 to reset all callee-saved registers. The term "callee-saved registers" means registers that should be saved by the called function

| 31:25 | 24:20 | 19:15 | 14:12 | 11:7 | 6:0 | Mnemonic |
|---|---|---|---|---|---|---|
| 0000100 | 00000 | rs1 | 000 | 00000 | 0001011 | ZALLBUTONE |
| 0000100 | 00001 | 00000 | 000 | 00000 | 0001011 | ZCALLER |
| 0000100 | 00010 | 00000 | 000 | 00000 | 0001011 | ZCALLEE |

Resetting of all Registers Except One, e.g., Stack Pointer

The ZALLBUTONE instruction causes core 48 to reset all registers except one specified register. In the above before returning from the function. Callee-saved registers in RISC-V, for example, are specified in Chapter 20 of the RISC-V Instruction Set Manual, cited above.

Resetting the callee-saved registers is important, for example, for preventing information leakage to the operating system (from the user-space to the kernel-space), e.g., in confidential computing applications. In confidential computing, the hosts (user-space) regard the operating system (kernel-space) as untrusted, and may therefore reset callee-saved registers before making a system call.

The ZALLBUTONE, ZCALLER and ZCALLEE instructions, and the above-described use-cases for using them, are non-limiting examples that have been chosen purely for the sake of conceptual clarity. In alternative embodiments, any other suitable instructions that reset multiple registers can be used.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A processor, comprising:
a set of registers; and
a processing core to execute instructions drawn from an Instruction Set Architecture (ISA), the ISA including an instruction that causes the core to reset a plurality of the registers in the set in a single clock cycle.

2. The processor according to claim 1, wherein the instruction causes the processing core to reset all the registers except for a specified register.

3. The processor according to claim 2, wherein the specified register is a stack pointer.

4. The processor according to claim 1, wherein the set of registers comprises caller-saved registers and callee-saved registers, and wherein the instruction causes the processing core to reset the caller-saved registers.

5. The processor according to claim 1, wherein the set of registers comprises caller-saved registers and callee-saved registers, and wherein the instruction causes the processing core to reset the callee-saved registers.

6. The processor according to claim 1, wherein the processing core is a Reduced Instruction Set Computer (RISC) core.

7. A network device, comprising:
a network interface for communicating packets with a network; and
a packet processor, comprising:
a set of registers; and
a processing core to execute instructions drawn from an Instruction Set Architecture (ISA), the ISA including an instruction that causes the core to reset a plurality of the registers in the set in a single clock cycle.

8. The network device according to claim 7, wherein the instruction causes the processing core to reset all the registers except for a specified register.

9. The network device according to claim 8, wherein the specified register is a stack pointer.

10. The network device according to claim 7, wherein the set of registers comprises caller-saved registers and callee-saved registers, and wherein the instruction causes the processing core to reset the caller-saved registers.

11. The network device according to claim 7, wherein the set of registers comprises caller-saved registers and callee-saved registers, and wherein the instruction causes the processing core to reset the callee-saved registers.

12. The network device according to claim 7, wherein the processing core is a Reduced Instruction Set Computer (RISC) core.

13. A method, comprising:
in a processor, executing instructions that access a set of registers, the instructions being drawn from an Instruction Set Architecture (ISA); and
as part of executing the instructions, executing an instruction drawn from the ISA that causes the processor to reset a plurality of the registers in the set in a single clock cycle.

14. The method according to claim 13, wherein the instruction causes the processing core to reset all the registers except for a specified register.

15. The method according to claim 14, wherein the specified register is a stack pointer.

16. The method according to claim 13, wherein the set of registers comprises caller-saved registers and callee-saved registers, and wherein executing the instruction comprises resetting the caller-saved registers.

17. The method according to claim 13, wherein the set of registers comprises caller-saved registers and callee-saved registers, and wherein executing the instruction comprises resetting the callee-saved registers.

18. The method according to claim 13, wherein the processing core is a Reduced Instruction Set Computer (RISC) core.

19. The processor according to claim 1, wherein the instruction causes the processing core to reset the plurality of the registers to one of:
zero;
a respective plurality of same values; and
two or more different predetermined values.

20. The processor according to claim 1, wherein the instruction causes the processing core to reset only a subset of bits of each of the registers in the plurality.

21. The network device according to claim 7, wherein the instruction causes the processing core to reset the plurality of the registers to one of:
zero;
a respective plurality of same values; and
two or more different predetermined values.

22. The network device according to claim 7, wherein the instruction causes the processing core to reset only a subset of bits of each of the registers in the plurality.

23. The method according to claim 13, wherein the instruction causes the processing core to reset the plurality of the registers to one of:
zero;
a respective plurality of same values; and
two or more different predetermined values.

24. The method according to claim 13, wherein the instruction causes the processing core to reset only a subset of bits of each of the registers in the plurality.

* * * * *